US012783295B2

(12) United States Patent
Poledna

(10) Patent No.: US 12,783,295 B2
(45) Date of Patent: Nov. 3, 2026

(54) METHOD FOR CONFIGURING A REAL-TIME COMPUTER SYSTEM

(71) Applicant: TTTech Auto AG, Vienna (AT)

(72) Inventor: Stefan Poledna, Klosterneuburg (AT)

(73) Assignee: TrustMotion Austria GmbH, Vienna (AT)

( * ) Notice: Subject to any disclaimer, the term of this patent is extended or adjusted under 35 U.S.C. 154(b) by 431 days.

(21) Appl. No.: 18/370,506

(22) Filed: Sep. 20, 2023

(65) Prior Publication Data

US 2024/0095068 A1 Mar. 21, 2024

(30) Foreign Application Priority Data

Sep. 21, 2022 (EP) .................................... 22196877

(51) Int. Cl.
*G06F 9/48* (2006.01)
*G06F 9/54* (2006.01)

(52) U.S. Cl.
CPC .............. *G06F 9/4881* (2013.01); *G06F 9/54* (2013.01)

(58) Field of Classification Search
CPC ......... G06F 9/4881; G06F 9/54; G06F 9/4887
See application file for complete search history.

(56) References Cited

U.S. PATENT DOCUMENTS 10,528,389 B2 1/2020 Zlatanchev et al.
2007/0277178 A1* 11/2007 Nagao ..................... G06F 9/485 718/108
2010/0177345 A1* 7/2010 Watanabe ............... G06F 3/126 358/1.15
2014/0196054 A1* 7/2014 Brochard ................ G06F 9/505 718/105
2015/0340091 A1* 11/2015 Zhu .................... G11C 13/0061 365/163

(Continued)

FOREIGN PATENT DOCUMENTS

EP 3 296 867 A1 3/2018

OTHER PUBLICATIONS

Hissam et al., "Predicting the Behavior of a Highly Configurable Component Based Real-Time System," Euromicro Conference on Real-Time Systems, 2008 IEEE, pp. 57-68, XP031289867, total of 12 pages.

(Continued)

*Primary Examiner* — Sisley N Kim

(57) ABSTRACT

A method for configuring a real-time computer system including resources for executing tasks, wherein at least one task is a real time task, wherein the resources include at least first and second processors and a communication subsystem interconnecting the processors and at least a first memory accessible by the first processor and at least a second memory accessible by the second processor, includes the steps: providing an estimate for an individual resource utilization of the tasks, providing for each resource a resource model; determining a configuration allocating each task to at least one of the resources according to a prediction at least based on the estimate for an individual resource utilization of the tasks and the resource model; measuring the real resource utilization of the tasks during execution, and refining of the prediction according to a result of the measuring and refining the configuration according to the refined prediction.

13 Claims, 6 Drawing Sheets

(56) References Cited

U.S. PATENT DOCUMENTS

| | | | | |
|---|---|---|---|---|
| 2016/0350214 | A1 * | 12/2016 | Payer | G06F 16/289 |
| 2022/0197773 | A1 * | 6/2022 | Butler | H04N 21/2223 |
| 2024/0224051 | A1 * | 7/2024 | Paczkowski | H04W 12/08 |

OTHER PUBLICATIONS

Dinda, Peter A., "A Prediction-based Real-time Scheduling Advisor", Proceedings of the International Parallel and Distributed Processing Symposium, 2002 IEEE, pp. 1-8, XP032343039, total of 8 pages.

* cited by examiner

| Task | Execution Time | Memory | Period | Rate | Deadline |
|---|---|---|---|---|---|
| AT1 | AT1_EXEC | AT1_MEM | AT1_PER | | AT1_DEAD |
| AT2 | AT2_EXEC | AT2_MEM | AT2_PER | | AT2_DEAD |
| AT3 | AT3_EXEC | AT3_MEM | | AT3_RATE | AT3_DEAD |
| AT4 | AT4_EXEC | AT4_MEM | | AT4_RATE | AT4_DEAD |

Fig. 4A

| Chain | Task1 | Task2 | Task3 | ... | Chain_Deadline |
|---|---|---|---|---|---|
| Chain1 | AT1 | AT2 | AT4 | | Chain1_Deadline |

Fig. 4B

| Message | Length | Period | Rate | Deadline | Sender | Receiver | Protocol |
|---|---|---|---|---|---|---|---|
| MSG1 | MSG1_LEN | MSG1_PER | | MSG1_DEAD | SEND1 | RECV1 | PROT1 |
| MSG2 | MSG2_LEN | MSG2_PER | | MSG2_DEAD | SEND2 | RECV2 | PROT2 |
| MSG3 | MSG3_LEN | | MSG3_RATE | MSG3_DEAD | SEND3 | RECV3 | PROT3 |

Fig. 5

| ECU | Processors | Memory | COM_Internal |
|---|---|---|---|
| ECU1 | P1 | M1 | |
| ECU2 | P2 | M2 | |
| ECU1a | P1a, P2a | M1a, M2a | P3-P4, Bandwidth, etc. |

Fig. 6

| COM | Processors | Type | Bandwidth |
|---|---|---|---|
| COM1 | P1, P2 | Type1 | BANDW1 |

Fig. 7

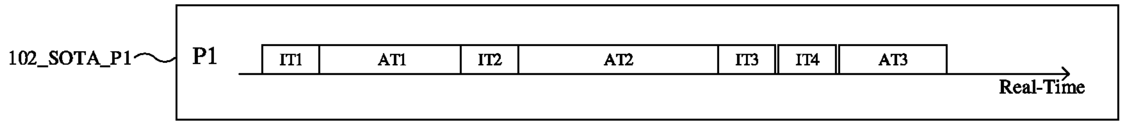

Fig. 8

METHOD FOR CONFIGURING A REAL-TIME COMPUTER SYSTEM

CROSS REFERENCE TO RELATED APPLICATIONS

Applicant claims priority under 35 U.S.C. § 119 of European Application No. 22196877.9 filed Sep. 21, 2022, the disclosure of which is incorporated by reference.

BACKGROUND OF THE INVENTION

1. Field of the Invention

The invention relates to a method for configuring a real-time computer system.

2. Description of the Related Art

A real-time computer system consists of hardware resources including processors, memories, and communication subsystems that are configured to be used by software modules. When the real-time system operates, said modules execute on said resources. A module in execution is called a task. One of a task's characteristics is its temporal execution pattern which is either periodic, sporadic, or aperiodic. Thus, tasks may be executed repeatedly during the runtime of the real-time computer system. A task instance refers to exactly one execution of a task. E.g., a periodic task corresponds to a sequence of task instances where the task instances become ready to execute periodically. Different tasks communicate with each other by the exchange of messages using a communication subsystem.

Message transmissions can be time-triggered, rate-constrained, or best-effort. The communication subsystem can be for example shared memory, point-to-point wired or wireless connections, or a communication network. Once the real-time system is put into operation (e.g., during development, operation, or maintenance) tasks execute and exchange messages. In order to execute successfully, tasks and messages put demands on resources which are satisfied by the real-time computer system by utilizing the said resources appropriately.

Selecting adequate resources during the development of a real-time system is non-trivial. For example, maximizing the resource utilization is a common design goal in this selection activity. Even once the resources have been selected it is non-trivial to demonstrate their sufficiency in all possible execution scenarios, simply because there are so many. This is of particular concern in safety-critical real-time systems where the system design must ensure that resources are always timely available for the safety-critical tasks and messages. Thus, a sufficiently well prediction of resource utilization of a given set of modules on a given set of resources is essential for a successful system design and its operation. Unfortunately, it is also immensely difficult.

There are three main causes complicating resource utilization prediction. First, the software modules are usually encoded in higher-order programming languages like C, C++, RUST, etc. Compilers and other tools translate the software modules from these higher-order programming languages into instructions that are executed on the resources, e.g., processors. Any prediction on resource utilization based on the higher-order programming language representation of a software module may only imperfectly reflect its representation in instruction level.

Secondly, the resources are physical artefacts and in order to reason about them, e.g., to predict their utilization, we must build models, typically expressed in some mathematical notation. These models may be incomplete or inaccurate. For example, processors may implement sophisticated methods, e.g., pipelines, to execute instructions. Thus, a model that abstracts said sophisticated methods from said processor will only inaccurately determine the execution time of an instruction. Other sources of model inaccuracies are the representation of caches or memories in general.

Thirdly, real-time systems implement many modules on many resources. Thus, there is a risk of hidden interactions, e.g., interactions not adequately covered in the models at use, and, consequently, unintended emergent phenomena may arise.

A closely related subject to resource utilization prediction is the calculation of the worst-case execution-time (WCET) of a task, i.e., the prediction of the maximum execution time of a given task. In order to predict the maximum utilization of a processor, the WCETs for all the tasks executing on said processor are calculated. The processor utilization is given by these WCETs and the temporal execution pattern of said tasks (e.g., periodic, sporadic, aperiodic). Often processor utilization is expressed as a percentage of the usage of the processor by said task set. E.g., given four periodic tasks with a WCET of 1 ms and a period of 10 ms each task could be scheduled cyclically one after the other. Thus, within a period of 10 ms the task set would utilize 4 ms and the processor utilization expressed in a percentage will be 40 percent. In this document we use the term utilization in the general sense: we also refer to the concrete usage pattern of a resource as resource utilization.

SUMMARY OF THE INVENTION

It is an objective of the invention to refine the prediction of resource utilization in real-time computer systems and to improve configuring of a real time computer system.

The present invention solves this objective by means of a method according to the independent claim. Further advantageous features are set out in the dependent claims.

According to the invention the method comprises the steps of

- measuring the real resource utilization of the tasks during execution, and
- refining of the prediction according to a result of the measuring and
- refining the configuration according to the refined prediction.

By means of the invention, the allocation of tasks to resources is highly improved, as the real demand for resources can be predicted with greater accuracy.

Preferably the tasks comprise at least one infrastructure task and at least one application task.

According to an embodiment at least a first task to be executed on said first processor is configured to send at least one message to at least a second task to be executed on said second processor.

According to a preferred embodiment a set of infrastructure tasks is determined to execute the application tasks.

Furthermore, a set of infrastructure messages to be communicated between infrastructure tasks and/or application tasks for executing the application tasks may be determined.

Advantageously a configuration of the system is calculated using the prediction, wherein the prediction is based at least on the resource model, the individual resource utilization of the at least one real-time task and the set of determined infrastructure tasks and infrastructure messages.

Preferably all tasks and messages are allocated to resources according to the configuration.

In an advantageous embodiment of the disclosed method the real resource utilization of tasks and/or a sequence of tasks and messages on the resources are measured during execution.

According to a further embodiment of the invention the prediction is realized as one, two, or a multitude of infrastructure tasks on one, two, or a multitude of processors in the real-time computer system.

According to another embodiment the prediction is realized as an application program in execution on a development computer connected to the real-time system.

In a further advantageous embodiment of the disclosed method prediction is realized as a service in a remote data center connected to the real-time system.

According to a preferred embodiment the measuring (MEASURE) is realized by one, two, or a multitude of infrastructure tasks on one, two, or a multitude of processors in the real-time computer system.

BRIEF DESCRIPTION OF THE DRAWINGS

Other objects and features of the invention will become apparent from the following detailed description considered in connection with the accompanying drawings. It is to be understood, however, that the drawings are designed as an illustration only and not as a definition of the limits of the invention.

In the drawings,

FIG. 4A shows an example for computation demands of tasks;

FIG. 4B shows an example of dependencies between application tasks;

FIG. 5 shows an example of communication demands in form of messages;

FIG. 6 shows an example of a part of a resource model;

FIG. 7 shows another example of a part of a resource model;

FIG. 8 shows an example of a part of a configuration;

DETAILED DESCRIPTION OF PREFERRED EMBODIMENTS

Figure 1:
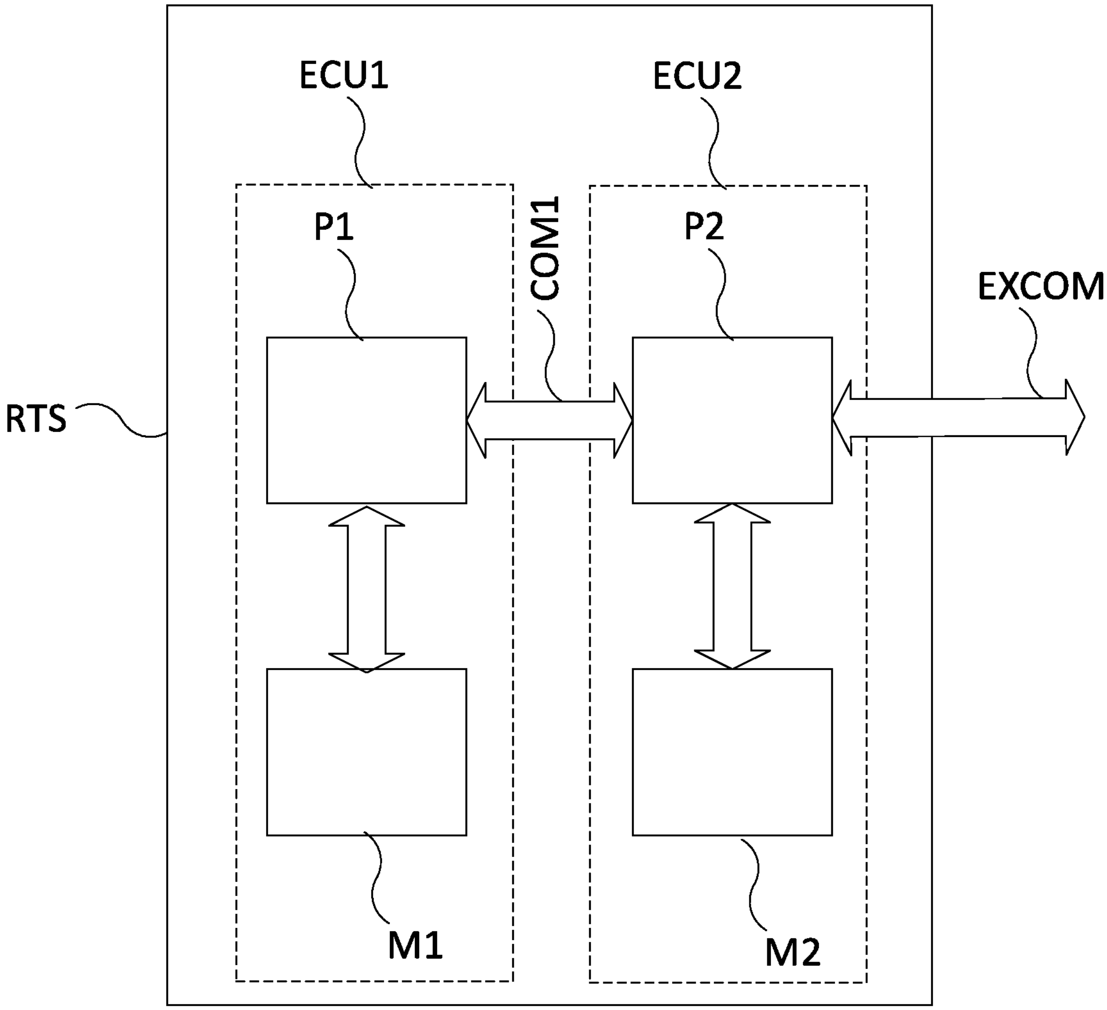
FIG. 1 shows an example real-time computer system.

Various embodiments are described herein to various apparatuses and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the claims.

Reference throughout the specification to “various embodiments,” “some embodiments,” “one embodiment,” or “an embodiment,” or the like, means that a particular feature, structure, or characteristic described in connection with the embodiment is included in at least one embodiment. Thus, appearances of the phrases “in various embodiments,” “in some embodiments,” “in one embodiment,” or “in an embodiment,” or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments without limitation given that such combination is not illogical or non-functional.

It must be noted that, as used in this specification and the appended claims, the singular forms “a,” “an” and “the” include plural referents unless the content clearly dictates otherwise.

The terms “first,” “second,” and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Furthermore, the terms “include,” “have,” and any variations thereof, are intended to cover a non-exclusive inclusion, such that a process, method, article, or apparatus that comprises a list of elements is not necessarily limited to those elements, but may include other elements not expressly listed or inherent to such process, method, article, or apparatus.

It is noted that in the differently described embodiments, the same parts are provided with the same reference numbers or the same component designations, wherein the disclosure can be applied to the same or similar parts with the same or similar reference numbers or the same or similar component designations. The position designations in the description, such as top, bottom, side, etc., are related to the directly described and illustrated figure and these position designations can be transferred to other positions for other figures.

All directional references (e.g., “plus”, “minus”, “upper”, “lower”, “upward”, “downward”, “left”, “right”, “leftward”, “rightward”, “front”, “rear”, “top”, “bottom”, “over”, “under”, “above”, “below”, “vertical”, “horizontal”, “clockwise”, and “counterclockwise”) are only used for identification purposes to aid the reader’s understanding of the present disclosure, and do not create limitations, particularly as to the position, orientation, or use of the any aspect of the disclosure. It is to be understood that the terms so used are interchangeable under appropriate circumstances such that the embodiments of the invention described herein are, for example, capable of operation in other orientations than those illustrated or otherwise described herein.

As used herein, the phrased "configured to," "configured for," and similar phrases indicate that the subject device, apparatus, or system is designed and/or constructed (e.g., through appropriate hardware, software, and/or components) to fulfill one or more specific object purposes, not that the subject device, apparatus, or system is merely capable of performing the object purpose.

Joinder references (e.g., "attached", "coupled", "connected", and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

Furthermore, it is noted that even if the individual steps of the method are specified in a claim in a certain order, the individual steps of the method do not necessarily have to be carried out in the specified order. In particular, the order of individual steps can be changed if this is technically possible. Several steps may also be carried out simultaneously. Thus, in the present context a method claim comprising several steps is to be understood as meaning that these steps must be present but that the order of the steps may differ and vary from the order stated in the claim.

All numbers expressing measurements and so forth used in the specification and claims are to be understood as being modified in all instances by the term "about."

FIG. 1 depicts an example real-time computer system RTS. The RTS may be an automotive advanced-driver assistance system (ADAS) or an automated driving system (ADS). However, the RTS is not bound to automotive applications. It may also implement control functions onboard an aircraft, spacecraft, railway, in industrial automation, turbines in new energy production, and similar.

It should be noted that, in order to improve readability, abbreviated designations of terms, which abbreviations are also used as reference signs in the figures, are mainly used instead of the full terms in the following description after the abbreviated designations have been introduced in the text. This means, for example, the above introduced term "RTS" is used instead of "real-time computer system" in the description.

The RTS of the embodiment shown in FIG. 1 consists of two electronic control units ECU1, ECU2 connected to each other with an onboard network COM1. Furthermore, ECU2 connects the RTS to the outside via an external network EXCOM. ECU1 and ECU2 both implement hardware resources, for example, processors P1, P2 and memory M1, M2. Other examples of hardware resources are graphical processing units (GPUs) and neuronal network processing units (NPUs) (not depicted). Example realizations of the onboard network COM1 are Ethernet, FlexRay, TTP, TTEthernet, PCIe.

Figure 2:
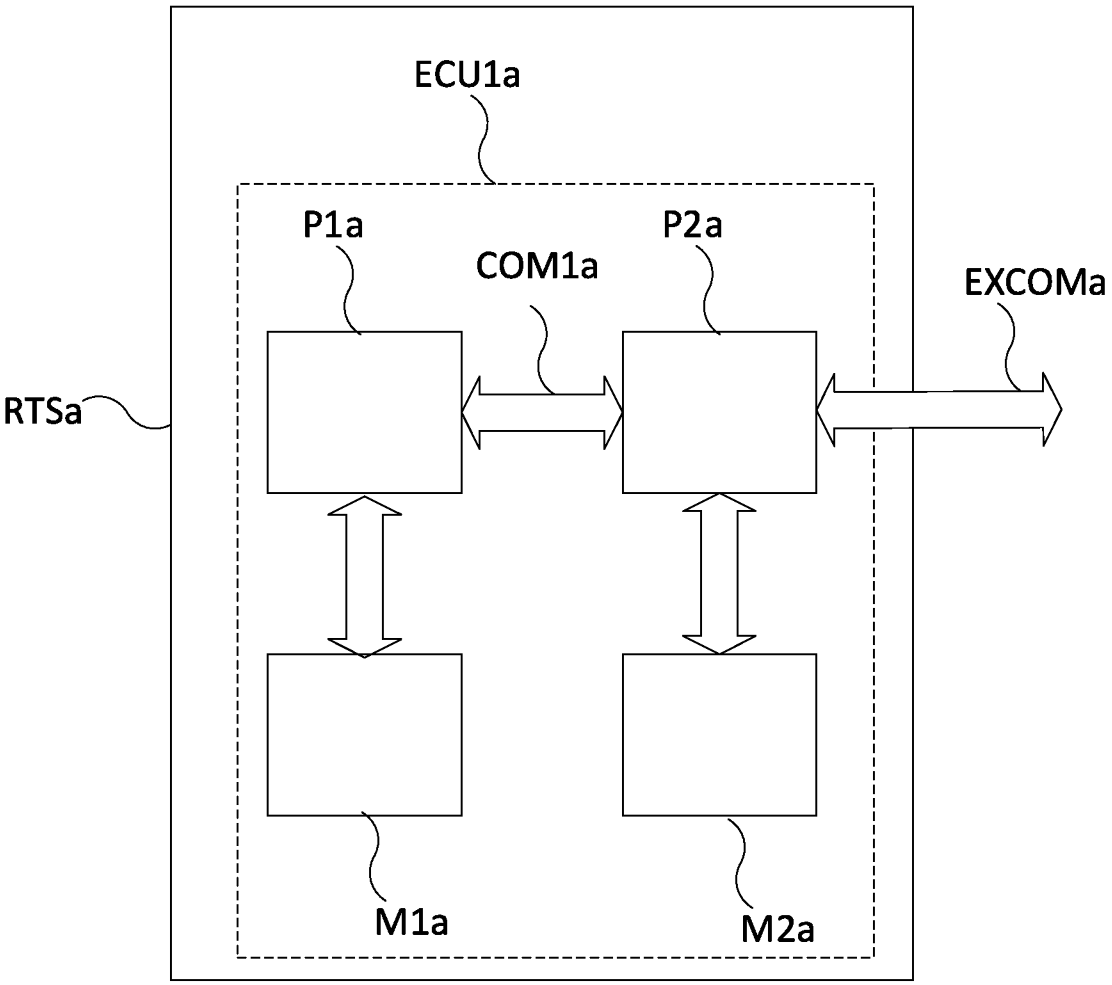
FIG. 2 shows another embodiment of a real-time-computer system.

FIG. 2 depicts another example real-time computer system RTSa. RTSa consists of a single electronic control unit ECU1*a* that integrates the core features of the previous example presented in FIG. 1. Examples to realize the communication subsystem COM1*a* are Ethernet, FlexRay, TTP, TTEthernet, PCI*e*, or shared memory.

Figure 3:
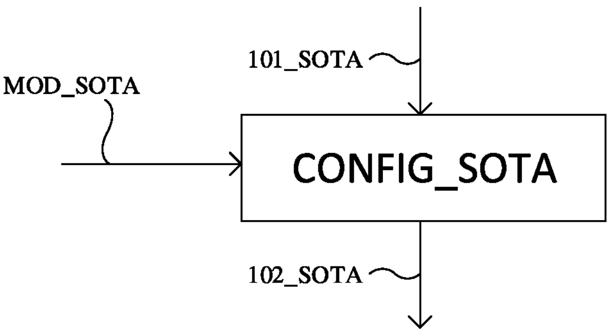
FIG. 3 shows a state-of-the-art configuration method.

FIG. 3 depicts a state-of-the-art configuration method CONFIG_SOTA. CONFIG_SOTA may take two inputs:

- 101_SOTA: the predicted resource demands for each task (an example is given in FIG. 4 for computation demands and FIG. 5 for communication demands) and task dependencies (an example is given in FIG. 4*a*)
- MOD_SOTA: a model of the resources of the real-time computer system RTS (an example is given in FIG. 6 for compute resources P1, P2 and in FIG. 7 for a communication resource COM1)

From these two inputs CONFIG_SOTA generates a configuration 102_SOTA that allocates the predicted resource demands of the individual tasks to resources in time, i.e., when the task is to use a resource and space, i.e., which resource(s) the task shall use. The allocation in time can be time-triggered, i.e., the points in time when a task or message shall use a resource are part of the generated configuration 102_SOTA, or derived dynamically during runtime of the RTS using dynamic real-time scheduling algorithms, e.g., Earliest-Deadline First or Rate-Monotonic Scheduling. A portion of an example configuration 102_SOTA is depicted in FIG. 8 for the resource allocation of P1.

FIG. 4A gives an example for computation demands of tasks AT1-AT4. In this example each task is characterized by a prediction of some or all of the following parameters:

- Execution Time: the worst-case execution time of the task
- Memory: the worst-case memory usage of the task
- Period: a periodic task will become ready for execution each Period timeunits
- Rate: a task may become ready for execution repeatedly, the Rate is the minimum time in between two task instances become ready for execution
- Deadline: a task instance must be executed after it becomes ready within at most Deadline—time-units. Usually execution of a task is stopped when the deadline is over. But in the present context a task may also continue to be executed after the deadline has been reached in order to determine how long the execution of the task really takes.

Some of the parameters follow from the concrete real-time application, for example, Period, Rate, and Deadline. Other parameters are derived from the actual software modules, for example, Execution time and Memory. There exist various state-of-the-art methods to determine said second class of parameters from software modules. For example, static code analysis or measurement-based approaches. It should be mentioned that the real-time-application constitutes a top-level function that has to be achieved, e. g. steer by wire. The real-time application may comprise several tasks.

FIG. 4B gives an example of dependencies between application tasks called computation chain Chain1. In this example, application tasks AT1, AT2, and AT4 have to be executed one after the other. Furthermore, in this example also a chain deadline Chain1 Deadline is defined that requires the real-time system to execute the computation chain Chain1 within Chain1 Deadline timeunits. Computation chains may be also part of the predicted resource demands 101, 101_SOTA.

FIG. 5 gives an example of communication demands in form of messages MSG1-MSG3. In this example each message is characterized by a prediction of some or all of the following parameters:

- Length: the length of the message
- Period: an analogy to tasks, also messages will repeatedly become ready for transmission and we call a particular message a message instance. A periodic message becomes ready for transmission in temporal equidistant points in time every Period timeunits.

Rate: the minimum time in between two message instances becoming ready for transmission Deadline: the message must be delivered from its sender to its receiver(s) in not more than deadline time-units after the message instance becomes ready for transmission. Messages that have a deadline defined are called Real-Time Messages.

Sender: the sending task of the message.

Receiver: the receiving task(s) of the message.

Protocol: the network protocol or suite of protocols used to transport said message. The Length of the message depends on the message's Protocol. Example protocols are, Ethernet, IP, TCP, UDP.

FIG. 6 gives an example of a part of a resource model MOD_SOTA. It lists for the electronic control units ECU1, ECU2, and ECU1*a* the implemented processors, memory, and internal communication resources COM internal.

FIG. 7 gives another example of a part of a resource model MOD_SOTA. It describes parameters for the communication subsystem resource COM1:

Processors identifies the processors that COM1 connects

Type defines the type of the communication subsystem

Bandwidth defines the bandwidth of the communication subsystem

FIG. 8 gives an example of a part of a configuration 102_SOTA, i.e., the configuration 102_SOTA_P1 for processor P1. As depicted the configuration method CONFIG_SOTA assigns the tasks AT1, AT2, and AT3 to processor P1 (i.e., assignment in space). In case of a time-triggered configuration also the actual starting points in time of the tasks AT1, AT2, and AT3 are explicitly part of the configuration 102_SOTA_P1. In case of dynamic real-time scheduling (e.g., Earliest Deadline first or Rate-Monotonic Scheduling) said points in time evolve during the execution of the real-time computer system RTS.

Modern real-time computer systems RTS typically implement real-time operating systems and may implement hypervisors. We call all non-application tasks the infrastructure tasks. Operating system tasks and hypervisor tasks are, thus, infrastructure tasks IT1-IT4. However infrastructure tasks IT1-IT4 also have resource demands. Thus, application tasks AT1-AT3 not necessarily execute one after the other on resources but they also need to share the resources with the infrastructure tasks IT1-IT4. FIG. 8 gives an execution example of application tasks AT1-AT3 with infrastructure tasks IT1-IT4. In an example realization the infrastructure tasks may be as follows:

IT1: operating system scheduling task activates AT1

IT1: operating system scheduling task activates AT2

IT3: hypervisor scheduling task deactivating the current virtual machine and activating another virtual machine IT4: operating system scheduling task (of the operating system in the new virtual machine) activates AT3.

Figure 9:
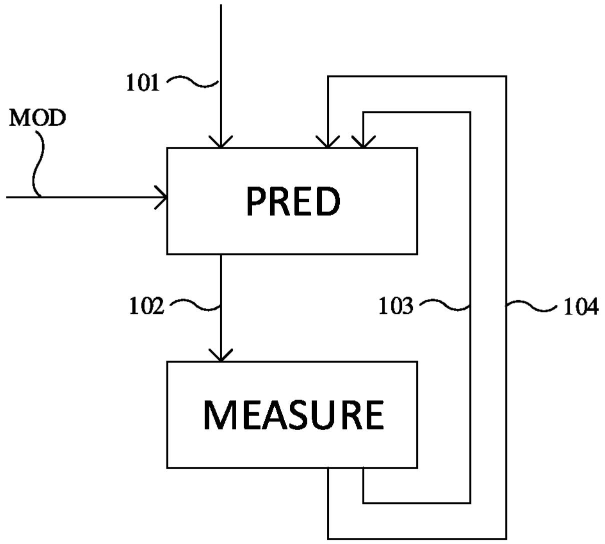
FIG. 9 shows a configuration method.

According to FIG. 9 the real resource utilization of the tasks is measured during execution, and the prediction is refined according to a result of the measuring.

The state-of-the-art configuration method is evolved to a self-measuring configuration method that consists of a prediction method PRED and a measurement method MEASURE coupled in a feedback loop to PRED.

PRED takes according to an embodiment as an input:

101: the predicted resource demands for each task (an example is given in FIG. 4 for computation demands and FIG. 5 for communication demands) and MOD: a model of the resources of the real-time computer system RTS (an example is given in FIG. 6 for compute resources P1, P2 and in FIG. 7 for a communication resource COM1).

PRED generates as output 102 a configuration that allocates the application tasks AT1-AT4 and their messages and measurement tasks and measurement messages to resources in time and space.

The measurement tasks may be infrastructure software modules in execution. Said infrastructure modules may be added to the operating system, the hypervisor, or a middleware software layer. Measurement tasks may be integrated with already existing infrastructure tasks (e.g., IT1, IT3, IT4) or may be new infrastructure tasks (e.g., ITM_M1, ITM_OUT).

A measurement task measures one, two, or a multitude of a task's parameters. A measurement message transports measurement information generated by measurement tasks.

Figure 11:
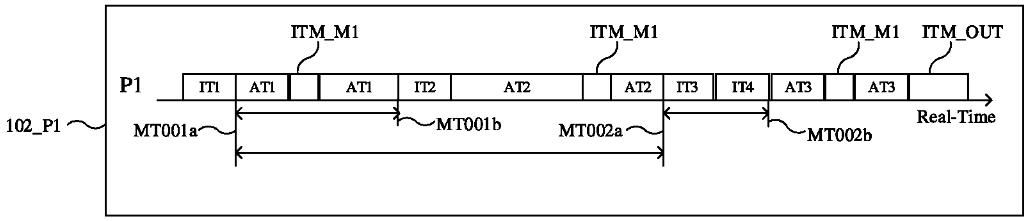
FIG. 11 and FIG. 12 show measurement tasks for memory measurements.
Figure 12:
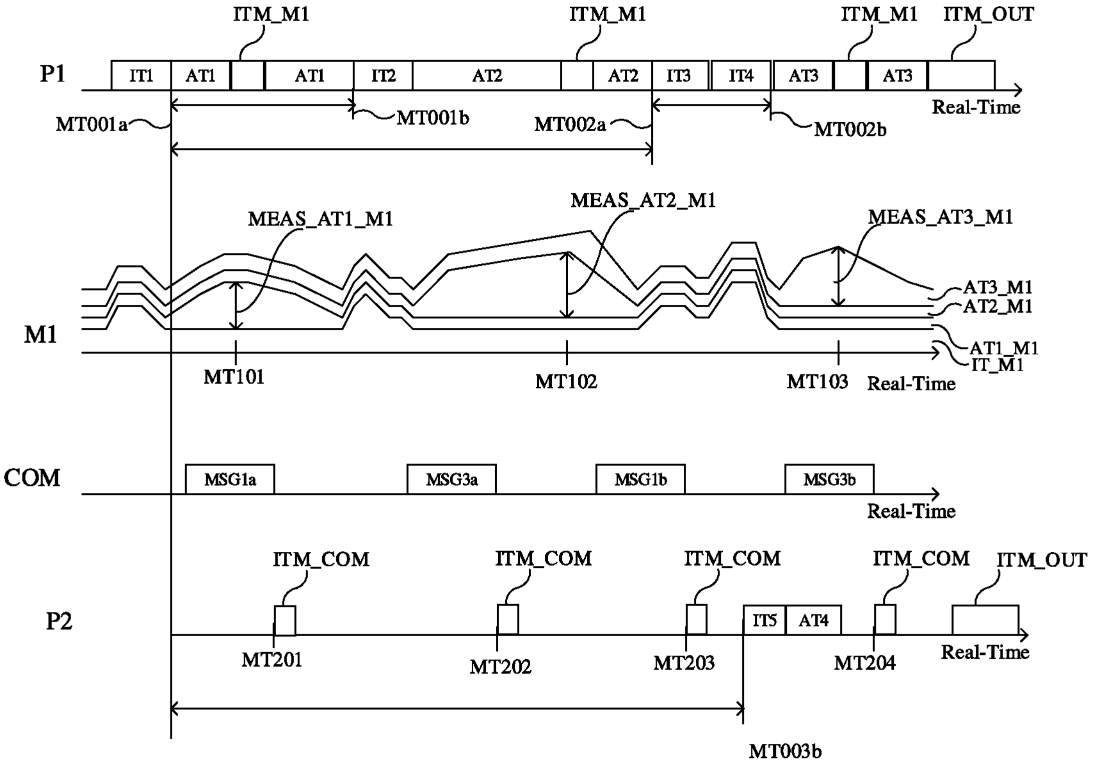

For example, FIG. 11 and FIG. 12 depict measurement tasks for memory measurements ITM_M1, for execution time measurements (part of infrastructure tasks IT1-IT4), and for communication latency measurements ITM_COM. In a realization measurement messages are generated by measurement tasks, e.g., by ITM_OUT.

Figure 14:
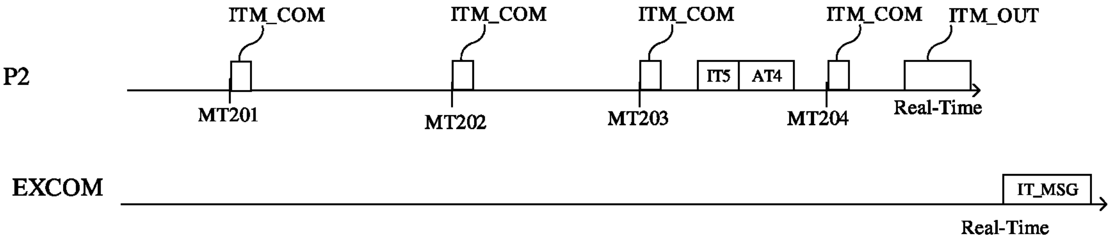
FIG. 14 shows a measurement message via an external communication subsystem to a remote prediction method.

For example, FIG. 14 depicts a measurement message IT_MSG via an external communication subsystem EXCOM to a remote PRED method.

PRED generates a configuration that instructs the RTS at which time and on which resources to execute said measurement tasks. In another realization PRED itself may generate the measurement tasks as part of the output 102.

In another realization, input 101 may include the ability to exert control over the configuration of the measurement tasks. For example input 101 could identify for which tasks which of the predicted parameters shall be measured.

Figure 10:
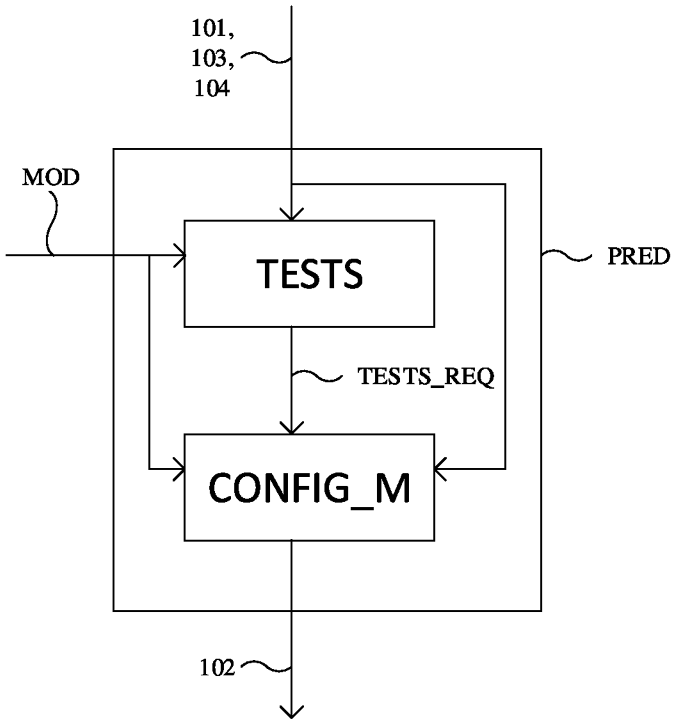
FIG. 10 shows an example implementation of a prediction method.

FIG. 10 depicts an example implementation of the prediction method PRED. In this example PRED distinguishes a TESTS method and a CONFIG_M method. TESTS defines which measurement tasks and measurement messages shall be implemented and provides this information as output TEST_REQ to CONFIG_M.

In one realization CONFIG_M equals CONFIG_SOTA, i.e., in such a realization the allocation of the measurement tasks and measurement messages to the resources is treated as CONFIG_SOTA discussed under FIG. 3. In such a realization, 101=101_SOTA+TEST_REQ. In another realization, CONFIG_M may differ from and/or extend CONFIG_SOTA.

For example, in one realization CONFIG_M allocates the application tasks, AT1-AT4, together with their respective measurement tasks.

In another realization, CONFIG_M may for a first allocation step increase the application tasks' AT1-AT4 demands and in a second step allocate the measurement tasks to the resources allocated to said increases.

TESTS defines measurement tasks and/or measurement messages for at least one, two, or a multitude of application tasks AT1-AT4 and/or one, two, or a multitude of messages sent between said application tasks.

In one realization 101 defines the application tasks for which TESTS defines measurement tasks.

In one realization 101 instructs TESTS to define additional measurement tasks and/or measurement messages.

For example:

101 may instruct TESTS to define a measurement task that measures the time from start of an application tasks (e.g., AT1) until the end of another application task (e.g., AT2), 101 may instruct TESTS to define additional measurement messages, 101 may instruct TESTS to execute a measurement task and/or to generate a measurement message at a given point in time with respect to a synchronized timebase within the real-time computer system RTS.

FIG. 11 shows an example of a part of a self-measuring configuration 102. Said example depicts the self-measuring configuration 102_P1 for the processor P1. In comparison to the state-of-the-art configuration 102_P1 SOTA depicted in FIG. 8, FIG. 11 depicts configured measurement tasks ITM_M1 and ITM_OUT as well as indicates measurement tasks integrated in existing infrastructure tasks IT1-IT4.

FIG. 11 particularly depicts the following measurements that will be executed during runtime of the real-time computer system (summarized as the MEASURE method in FIG. 9):

IT1 and IT2 measure the Execution Time of AT1 (e.g., MT001*b*-MT001*a*)

ITM_M1 measures the Memory utilization of AT1, AT2, and AT3

IT1 and IT3 measure the time from start of AT1 until end of AT2 (e.g., MT002*a*-MT001*a*)

IT3 and IT4 measure the time from start of IT3 until end of IT4 (e.g., MT002*b*-MT002*a*).

In one realization the measurement task ITM_OUT sends a measurement message with results of one, two, or a multitude of said measurements to the PRED method (103 and 104 in FIG. 9).

FIG. 12 shows measurement tasks as discussed under FIG. 11. Furthermore, FIG. 12 depicts measurement tasks that measure resource utilizations on multiple resources:

IT1 and IT5 measure the time from start of AT1 until start of task IT5 (e.g., MT003*b*-MT001*a*).

FIG. 12 also depicts a measurement task ITM_COM that measures the arrival times MT201, MT202, MT203 of messages MSG1*a*, MSG3*a*, MSG1*b*. In this example the measurement task ITM_OUT realizes the delivery 103, 104 of measured information from the MEASURE method to the PRED method.

The PRED method may use said information to refine the prediction of the individual resource utilization and/or the total resource utilization (Although in most cases the demands for resources will be increased it may also be the case that the demands for resources may be decreased), to change, add, and/or remove measurement tasks, to generate a new configuration 102 and may deploy said new configuration to the real-time computer system RTS.

Figure 13:
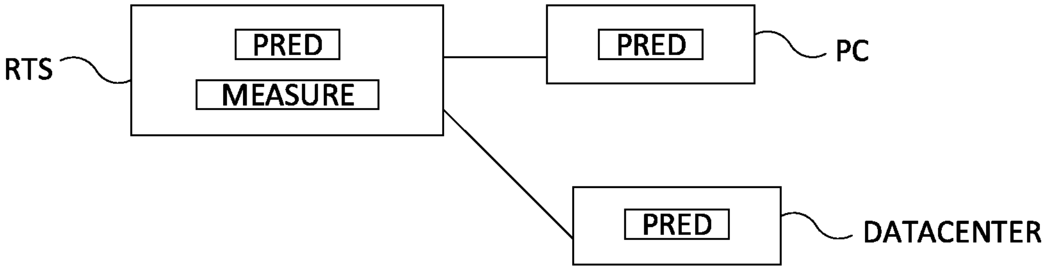
FIG. 13 shows allocations of tasks executing prediction and measurement.

FIG. 13 depicts possible allocations of the tasks that execute the PRED and MEASURE method.

MEASURE is always executed by means of measurement tasks and/or measurement messages as part of the real-time computer system RTS PRED may execute in the RTS, in a separate computer connected to the RTS, and/or in a remote datacenter, for example in the cloud.

FIG. 14 shows a measurement message IT_MSG. P2 sends IT_MSG via an external communication subsystem EXCOM to a remote PRED method.

Although only a few embodiments of the present invention have been shown and described, it is to be understood that many changes and modifications may be made thereunto without departing from the spirit and scope of the invention.

What is claimed is:

1. A method for configuring a real-time computer system (RTS, RTSa) comprising resources for executing tasks (AT1-AT4, IT1-IT5, ITM_M1, ITM_OUT), wherein at least one of the tasks is a real time task;

wherein the resources in the real-time computer systems (RTS, RTSa) comprise at least a first and a second processor (P1, P2) and a communication subsystem (COM1, COM1*a*) interconnecting at least said first and second processor (P1, P2) and at least a first memory (M1) accessible by said first processor and at least a second memory (M2) accessible by said second processor wherein the method comprises the steps:

providing an estimate for an individual resource utilization (101_SOTA, 101, 103, 104) of the tasks, providing for each resource a resource model (MOD_SOTA, MOD);

determining a configuration allocating each of the tasks to at least one of the resources according to a prediction at least based on said estimate for an individual resource utilization (101_SOTA, 101, 103, 104) of the tasks and said resource model; further comprising the steps of measuring the real resource utilization of the tasks during execution, and refining of the prediction according to a result of the measuring; and refining the configuration according to the refined prediction;

wherein the measuring is performed by measurement tasks configured to execute on the real-time computer system to measure execution times of a sequence of tasks which includes one or more memory measurement tasks executed during application tasks of the sequence of tasks, and wherein the resource model is used as an input to determine the measurement tasks.

2. The method according to claim 1, wherein the tasks comprise at least one infrastructure task (IT1-IT5, ITM_M1, ITM_OUT) and at least one application task (AT1-AT4).

3. The method according to claim 2, wherein, at least a first task to be executed on said first processor is configured to send at least one message (MSG1*a*, MSG3*a*, MSG1*b*, MSG3*b*) to at least a second task to be executed on said second processor.

4. The method according to claim 2, wherein a set of infrastructure tasks (IT1-IT5, ITM_M1, ITM_OUT, ITM_COM) is determined to execute the application tasks.

5. The method according to claim 4, wherein a set of infrastructure messages to be communicated between infrastructure tasks and/or application tasks for executing the application tasks is determined.

6. The method according to claim 5, wherein a configuration (102) of the system is calculated using the prediction, wherein the prediction is based at least on the resource model, the individual resource utilization (101_SOTA, 101, 103, 104) of the at least one real-time task and the set of determined infrastructure tasks and infrastructure messages.

7. The method according to claim 6, wherein all tasks and messages are allocated to resources according to the configuration.

8. The method according to claim 1, wherein the real resource utilization of tasks and/or a sequence of tasks and messages on the resources are measured during execution.

9. The method according to claim 1, wherein the prediction is realized as one, two, or a multitude of infrastructure tasks on one, two, or a multitude of processors in the real-time computer system.

10. The method according to claim 1, wherein the prediction is realized as an application program in execution on a development computer connected to the real-time system.

11. The method according to claim 1, wherein the prediction is realized as a service in a remote data center connected to the real-time system.

12. The method according to claim 1, wherein the measuring (MEASURE) is realized by one, two, or a multitude of infrastructure tasks on one, two, or a multitude of processors in the real-time computer system.

13. The method according to claim 1, wherein the measurement tasks each generate a measurement message at a given point in time with respect to a synchronized timebase within the RTS.

* * * * *